(12) United States Patent
Mittelsteadt et al.

(10) Patent No.: US 9,634,874 B2
(45) Date of Patent: Apr. 25, 2017

(54) BONDED OFDM COMMUNICATION SYSTEM

(71) Applicant: ViXS Systems Inc., Toronto (CA)

(72) Inventors: Cimarron Mittelsteadt, Santa Clarita, CA (US); Amit Ranjan Dubey, Los Angeles, CA (US); Michael Cave, Austin, TX (US)

(73) Assignee: VIXS SYSTEMS INC., Toronto (CA)

( * ) Notice: Subject to any disclaimer, the term of this patent is extended or adjusted under 35 U.S.C. 154(b) by 0 days.

(21) Appl. No.: 15/000,912

(22) Filed: Jan. 19, 2016

(65) Prior Publication Data

US 2016/0211996 A1    Jul. 21, 2016

Related U.S. Application Data

(60) Provisional application No. 62/104,177, filed on Jan. 16, 2015, provisional application No. 62/104,182, filed on Jan. 16, 2015, provisional application No. 62/112,795, filed on Feb. 6, 2015.

(51) Int. Cl.
| | | |
|---|---|---|
| *H04L 27/00* | (2006.01) | |
| *H04L 27/26* | (2006.01) | |
| *H04L 29/08* | (2006.01) | |

(52) U.S. Cl.
CPC ......... *H04L 27/26* (2013.01); *H04L 27/2626* (2013.01); *H04L 27/2647* (2013.01); *H04L 69/323* (2013.01)

(58) Field of Classification Search
CPC .............................. H04L 27/26; H04L 69/323
USPC .......................................................... 375/260
See application file for complete search history.

(56) References Cited

U.S. PATENT DOCUMENTS

| | | | | |
|---|---|---|---|---|
| 8,238,227 B2 * | 8/2012 | Kliger | ................... | H04L 27/261 370/210 |
| 8,737,254 B2 * | 5/2014 | Kliger | ................. | H04L 12/2861 370/230 |
| 2004/0163129 A1 * | 8/2004 | Chapman | ............... | H04H 20/79 725/126 |
| 2005/0163196 A1 * | 7/2005 | Currivan | ................... | H04B 1/71 375/144 |
| 2007/0177623 A1 * | 8/2007 | Logvinov | ........... | H04L 12/2838 370/463 |
| 2008/0209489 A1 * | 8/2008 | Joyce | ................... | H04L 12/2801 725/111 |
| 2014/0192803 A1 * | 7/2014 | Malik | ..................... | H04L 45/00 370/389 |
| 2015/0050025 A1 * | 2/2015 | Schemmann | ...... | H04Q 11/0003 398/68 |

\* cited by examiner

*Primary Examiner* — Helene Tayong

(57) ABSTRACT

An orthogonal frequency division multiplexing (OFDM) communication system includes a first interface having a first cable coupler to couple to a first end of a coaxial cable, and a first plurality of signal pathways coupled to the first cable coupler. Each signal pathway of the first plurality includes a physical (PHY) layer component and a radio frequency (RF) front end coupled to the PHY layer component. The system further includes a second interface having a second cable coupler to couple to a second end of a coaxial cable, and a second plurality of signal pathways coupled to the second cable coupler. Each signal pathway of the second plurality corresponds to a signal pathway of the first plurality and includes a PHY layer component and an RF front end coupled to the PHY layer component.

15 Claims, 3 Drawing Sheets

BONDED OFDM COMMUNICATION SYSTEM

CROSS-REFERENCE TO RELATED APPLICATIONS

The present application claims priority to the following co-pending applications, the entireties of which are incorporated by reference herein:

U.S. Patent Application Ser. No. 62/104,177, entitled "Multiplex Bonded OFDM Communication System" and filed on Jan. 16, 2015;

U.S. Patent Application Ser. No. 62/104,182, entitled "Extended Bonded OFDM Communication System" and filed on Jan. 16, 2015; and U.S. Patent Application Ser. No. 62/112,795, entitled "OFDM Communication Systems" and filed on Feb. 6, 2015.

FIELD OF THE DISCLOSURE

The present disclosure generally relates to communications systems and, more particularly, to orthogonal frequency division multiplex (OFDM) communications systems.

BACKGROUND

Various communication systems, such as Multimedia over Coax Alliance (MoCA)-based systems, have been developed to communicate multimedia data over coaxial cable or other similar physical interconnects. Such systems typically rely on orthogonal frequency division multiplex (OFDM)-based signaling at the interfaces to the coaxial cable. The physical (PHY)/media access controller (MAC) interaction at such interfaces often presents a bottleneck in the data throughput at such interfaces.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
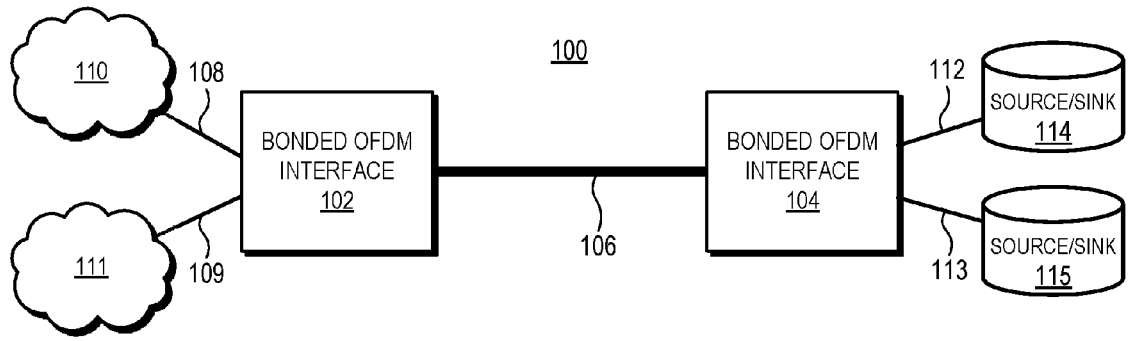
FIG. 1 is a block diagram illustrating a bonded OFDM communications system in accordance with at least one embodiment of the present disclosure.

FIG. 1 illustrates a bonded OFDM communications system 100 in accordance with at least one embodiment of the present disclosure. In the depicted example, the communications system 100 implements a bonded OFDM interface 102 coupled to a corresponding bonded OFDM interface 104 via a coaxial cable network 106, with the OFDM interface 102 coupled to one end of the coaxial cable network 106 and the OFDM interface 104 coupled to another end of the coaxial cable network 106. The coaxial cable network 106 may comprise, for example, a traditional coax home network or coax business network on which OFDM-based signaling (e.g., in the form of Orthogonal Frequency-Division Multiple Access (OFMDA)) is employed to transmit and receive multimedia data or other data. Each of the OFDM interfaces 102, 104 includes one or more Ethernet interfaces to couple to other devices or to other networks. For example, in the illustrated embodiment, the OFDM interface 102 includes two Ethernet interfaces 108, 109 to connect to networks 110, 111, respectively, and the OFDM interface 104 includes two Ethernet interfaces 112, 113, to connect to devices 114, 115, respectively. The networks 110, 111 may comprise, for example, Gigabit Ethernet networks, optical networks, wireless local area networks, and the like. One or both of the devices 114, 115 may comprise source devices, that is, devices that serve as the source of data to be transmitted, such as set top boxes (STBs), data storage devices, multimedia servers, and the like. Alternatively, one or both of the devices 114, 115 may comprise sink devices, that is, devices that serve to receive the data so transmitted, such as televisions or other displays.

The OFDM interfaces 102, 104 are connected to their respective ends of the coaxial cable network 106 via coaxial cable couplers (not shown in FIG. 1), which may comprise, for example, male F-type or N-type coaxial cable connector adapted to couple to a corresponding female coaxial connector of the coaxial cable network 106. The Ethernet interfaces of the OFDM interface 102, 104 may comprise any of a variety of Ethernet-based or Ethernet-compatible interfaces, such as a media independent interface (MII), including 10 Gigabit MII (XGMII), Serial Gigabit MII (SGMII), and the like.

As described in greater detail below with reference to the implementations depicted in FIGS. 2-5, in at least one embodiment the interfaces 102, 104 are configured to provide multiple signal pathways between the corresponding Ethernet interfaces and the coaxial cable network 106, whereupon these multiple signal pathways are bonded together so as to form a single high-throughput physical channel for transmitting or receiving data for the corresponding Ethernet interface, and thus avoiding the bottleneck at the Ethernet-to-coax interface as often found in conventional OFDMA-based communications systems. Further, in some implementations, the signal paths may be modulated at an RF frequency that is greater than the standard MoCA-specified modulation frequency (e.g., at twice the MoCA modulation frequency), thereby providing improved data throughput. To illustrate, in implementations with two RF front ends, a modulation rate of 200 MHz (2×BW) may be employed, and thus provide an aggregate RF channel bandwidth of 425 MHz (including a 25 MHz separation band), and thus provide a data rate of approximately 2.7 gigabits per second (Gbps) in accordance with MoCA OFDM transmission specifications. Similarly, in implementations with four RF front ends, the MoCA-specified modulation rate of 100 MHz (1×BW) may be employed, and thus provide an aggregate RF channel bandwidth of 475 MHz (including three 25 MHz separation bands), and thus provide a data rate of approximately 2.6 Gbps in accordance with MoCA OFDM transmission specifications.

Figure 2:
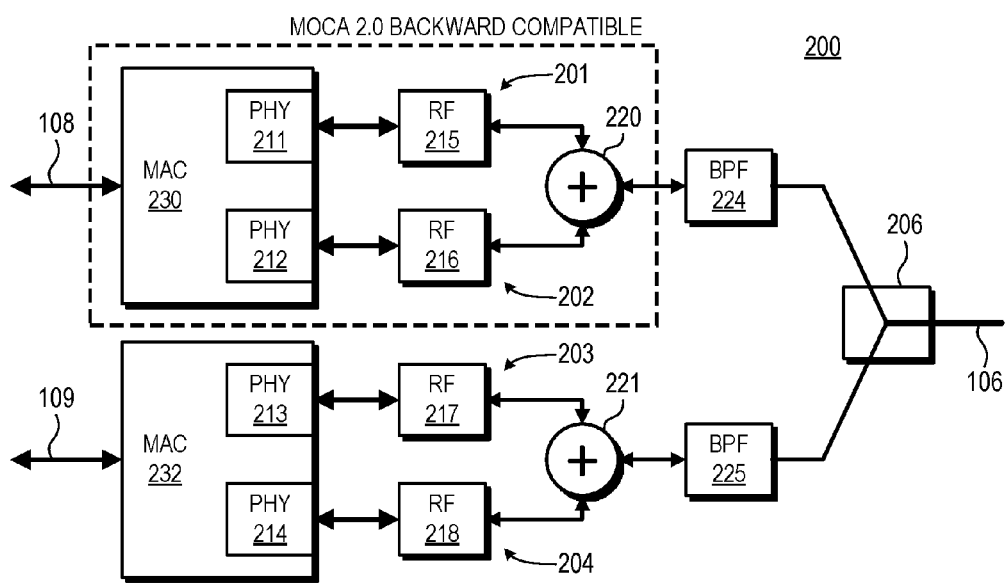
FIG. 2 is a block diagram illustrating an example implementation of a bonded OFDM interface of the system of FIG. 1 in accordance with at least one embodiment of the present disclosure.

FIG. 2 illustrates an example implementation 200 of the OFDM interface 102 in accordance with at least one embodiment of the present disclosure. The OFDM interface 104 is likewise implemented, and thus description of the implementation 200 of the OFDM interface 102 refers equally to the corresponding implementation of the OFDM interface 104 unless otherwise noted. In the depicted example, the implementation 200 includes a plurality of signal paths, such as signal paths 201, 202, 203, 204, between the Ethernet interfaces 108, 109, and a coaxial cable coupler 206 that serves to physically and electrically couple the OFDM interface 102 to a corresponding end of the coaxial cable network 106. The signal paths 201 and 202 operate as part of a physical channel dedicated to the Ethernet interface 108, and the signal paths 203 and 204 operate as part of a physical channel dedicated to the Ethernet interface 109. Each signal path includes a physical (PHY) layer component and a corresponding radio frequency (RF) front end, so that signal path 201 includes PHY layer component 211 and RF front end 215, signal path 202 includes PHY layer component 212 and RF front end 216, signal path 203 includes PHY layer component 213 and RF front end 217, and signal path 204 includes PHY layer component 214 and RF front end 218. Further, the RF front ends 215 and 216 are coupled to a signal combiner/splitter 220 (also often referred to a power combiner/splitter), which in turn is connected to a bandpass filter 224, which operates to bandpass filter outgoing signaling or incoming signaling for the particular passband of the corresponding physical channel. The bandpass filter 224 in turn is coupled to the coaxial cable coupler 206 that is coupled to an end of the coaxial cable network 106. The RF front ends 217 and 218 are coupled to signal combiner/splitter 221, which in turn is coupled to a bandpass filter 225, which operates to bandpass filter outgoing signaling or incoming signaling for the particular passband of the corresponding physical channel. The bandpass filter 225, like bandpass filter 224, is coupled to the coaxial cable coupler 206.

As there are two Ethernet interfaces and two corresponding physical channels, in implementation 200 the OFDM interface 102 implements two media access controllers (MACs) 230, 232—one for each physical channel. The MACs 230, 232 operate to as the interface between the Ethernet layer and the PHY layer and provide various MAC functions known to those skilled in the art, including addressing, frame parsing, error detection and correction, and the like. In at least one embodiment, each of MACs 230, 232 is implemented as a separate chip. Further, the MAC 230 implements the PHY layer components 211, 212 of the first physical channel and the MAC 232 implements the PHY layer components 213, 214, of the second physical channel. Under this approach, as each physical channel has two signal paths that may be modulated at a standard MoCA modulation frequency (e.g., 100 MHz), each physical path may have an overall throughput of approximately twice the standard MoCA transceiver throughput.

In a transmit operation, data to be transmitted is received via one of the Ethernet interfaces 108, 109. At the corresponding MAC, the data is distributed to the two PHY layer components, which operate to provide separate bit-level data streams to the corresponding RF front ends. The RF front ends convert the bit-level data streams to RF signaling in a corresponding band at a corresponding modulation frequency (e.g., 100 MHz), and the corresponding signal combiner/splitter combines the RF signals into a single bonded signal that is bandpass filtered by the corresponding bandpass filter. The resulting filtered RF signal is then provided to the coaxial cable coupler 206 for transmission along the coaxial cable network along with any filtered RF signaling received from the other physical channel.

In a receive operation, RF signaling is received at the coaxial cable coupler 206 from the coaxial cable network 106. This received RF signaling is bandpass filtered by each of the bandpass filters 224, 225 for their respective pass bands. The filtered RF signaling output by the bandpass filter 224 is de-bonded at the signal combiner/splitter 220 into two RF signals. The two RF signals are converted to bit-level digital streams by the RF front ends 215, 216, and these bit-level digital streams are processed at the PHY level by the PHY layer components 211, 212. The MAC 230 then combines the two digital streams into a single digital stream that is output via the Ethernet interface 108. The same process is performed with respect to the second physical channel associated with the bandpass filter 225, the RF front ends 217, 218, the PHY layer components 213, 214, and the MAC 232 to generate a single digital stream output via the Ethernet interface 109.

Further, to provide backward compatibility with one or more Multimedia over Coax Alliance (MoCA) specifications in anticipation of connection of the OFDM interface 102 to a MoCA-compatible device, at least one of the two physical channels, such as the physical channel provided by MAC 230, RF front ends 215, 216, and the signal combiner/splitter 220, may be configured to be backward compatible with at least one MoCA specification, such as MoCA v1.0, v1.1, or v2.0, through configuration of the PHY components and RF filter component to accommodate the targeted specifications, and by configuring the MAC and PHY components to handle the appropriate system protocol.

Figure 3:
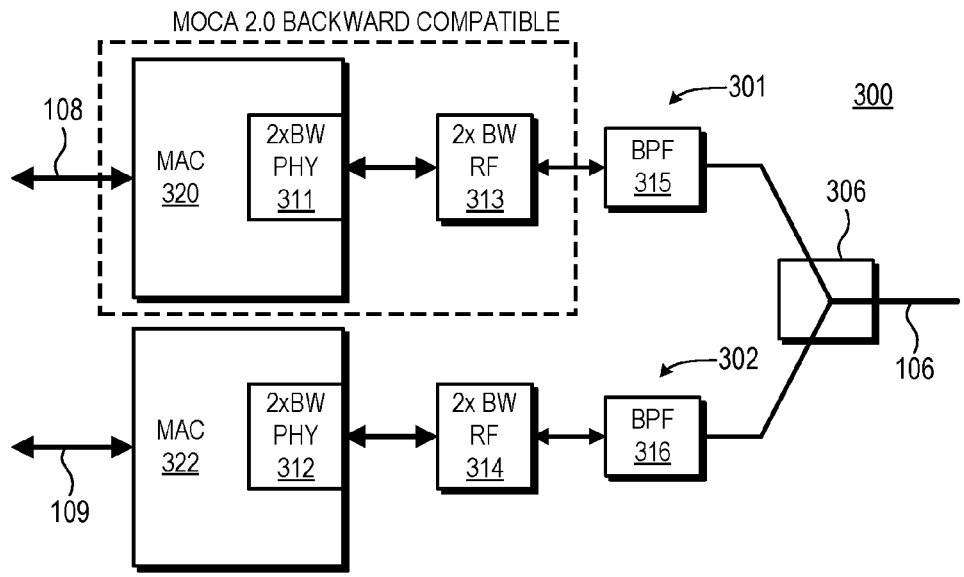
FIG. 3 is a block diagram illustrating another example implementation of a bonded OFDM interface of the system of FIG. 1 in accordance with at least one embodiment of the present disclosure.

FIG. 3 illustrates an example implementation 300 of the OFDM interface 102 in accordance with at least one embodiment of the present disclosure. The OFDM interface 104 is likewise implemented, and thus description of the implementation 300 of the OFDM interface 102 refers equally to the corresponding implementation of the OFDM interface 104 unless otherwise noted. In the depicted example, the implementation 300 includes two signal paths 301 and 302 leading to and from a coaxial cable coupler 306 that serves to serves to physically and electrically couple the OFDM interface 102 to a corresponding end of the coaxial cable network 106. The signal path 301 operates as part of a physical channel dedicated to the Ethernet interface 108, and the signal path 302 operates as part of a physical channel dedicated to the Ethernet interface 109. Each signal path includes a PHY layer component and a corresponding radio frequency (RF) front end, so that signal path 301 includes PHY layer component 311 and RF front end 313 and signal path 302 includes PHY layer component 312 and RF front end 314. Further, the RF front ends 313, 314 are coupled to bandpass filters 315 and 316, respectively, which operate to bandpass filter outgoing signaling or incoming signaling for the particular passband of the corresponding physical channel. The bandpass filters 315, 316 in turn are coupled to the coaxial cable coupler 306 that is coupled to an end of the coaxial cable network 106.

As there are two Ethernet interfaces and two corresponding physical channels, in implementation 300 the OFDM interface 102 implements two MACs 320, 322—one for each physical channel. In at least one embodiment, each of MACs 320, 322 is implemented as a separate chip. Further, the MAC 320 implements the PHY layer component 311 of the first physical channel and the MAC 322 implements the PHY layer components 312 of the second physical channel. Further, as there is a single RF front end for each physical channel, in at least one embodiment the PHY layer components 311, 312 and the RF front ends 313 are modulated at a frequency that is twice the standard bandwidth (BW) used for the physical channel in accordance with the applicable MoCA specification (that is, at 2× BW). For example, while the MoCA v2.0 specification provides for a 100 MHz modulation frequency, the modulation frequency implemented for the signal paths 301, 302 instead may be 200 MHz, thereby enabling a throughput of approximately twice the throughput of a conventional MoCA transceiver. Further, to provide backwards compatibility in anticipation of connection of the OFDM interface 102 to a MoCA-compatible device, at least one of the two physical channels, such as the physical channel provided by MAC 320 and the RF front end 313 may be configured to be backward compatible with at least one MoCA specification.

In a transmit operation, data to be transmitted is received via one of the Ethernet interfaces 108, 109. At the corresponding MAC, the data is distributed to the PHY layer component, which operate to provide separate bit-level data streams to the corresponding RF front ends at twice the standard MoCA rate. The RF front end converts the bit-level data streams to RF signaling in a corresponding band at a corresponding modulation frequency that may be, for example, twice the standard MoCA modulation frequency (e.g., 200 MHz), and the RF signal is then bandpass filtered by the corresponding bandpass filter. The resulting filtered RF signal is then provided to the coaxial cable coupler 306 for transmission along the coaxial cable network along with any filtered RF signaling received from the other physical channel.

In a receive operation, RF signaling is received at the coaxial cable coupler 306 from the coaxial cable network 106. This received RF signaling is bandpass filtered by each of the bandpass filters 315, 316 for their respective pass bands. The resulting two RF signals are converted to bit-level digital streams by the RF front ends 313, 314, and these bit-level digital streams are processed at the PHY level by the PHY layer components 311, 312 to generate two respective digital streams, which are then output by the MACs 320, 322 over the Ethernet interfaces 108, 109, respectively.

Figure 4:
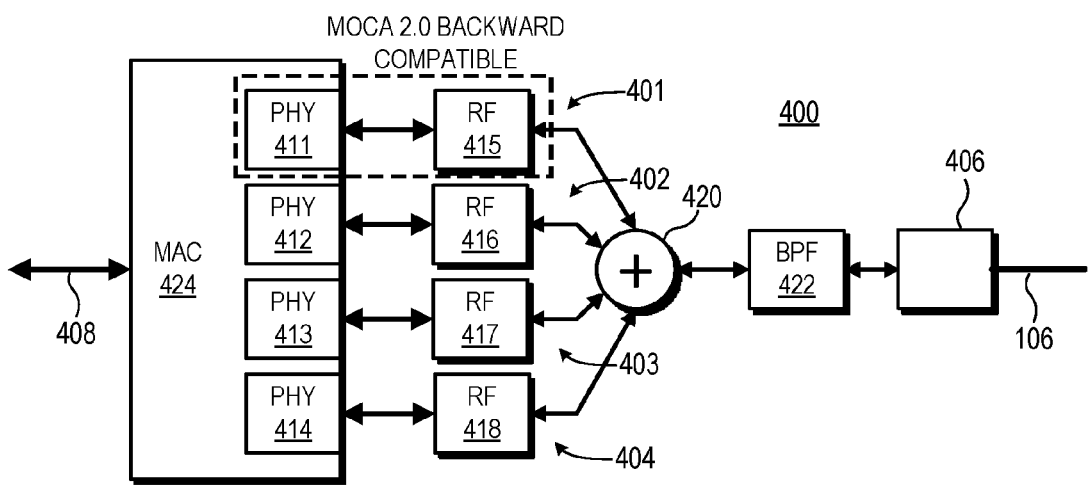
FIG. 4 is a block diagram illustrating yet another example implementation of a bonded OFDM interface of the system of FIG. 1 in accordance with at least one embodiment of the present disclosure.

FIG. 4 illustrates an example implementation 400 of the OFDM interface 102 in accordance with at least one embodiment of the present disclosure. The OFDM interface 104 is likewise implemented, and thus description of the implementation 400 of the OFDM interface 102 refers equally to the corresponding implementation of the OFDM interface 104 unless otherwise noted. In the depicted example, the implementation 400 includes four signal paths 401, 402, 403, 404 between a single Ethernet interface 408 and a coaxial cable coupler 406 that serves to physically and electrically couple the OFDM interface 102 to a corresponding end of the coaxial cable network 106. The signal paths 401-404 operate as part of a single physical channel dedicated to the Ethernet interface 408. Each signal path includes a PHY layer component and a corresponding RF front end, so that signal path 401 includes PHY layer component 411 and RF front end 415, signal path 402 includes PHY layer component 412 and RF front end 416, signal path 403 includes PHY layer component 413 and RF front end 417, and signal path 404 includes PHY layer component 414 and RF front end 418. Further, the RF front ends 415-418 are coupled to a signal combiner/splitter 420, which in turn is connected to a bandpass filter 422. The bandpass filter 422 in turn is coupled to the coaxial cable coupler 406 that is coupled to an end of the coaxial cable network 106.

As there is a single Ethernet interface and single physical channel, in implementation 400, the OFDM interface 102 implements a single MAC 424 which implements the PHY layer components 411-414. Under this approach, the physical channel has four signal paths that may be modulated at a standard MoCA modulation frequency (e.g., 100 MHz) and thus the physical channel may have an overall throughput of approximately four times the standard MoCA transceiver throughput. Further, to provide backwards compatibility in anticipation of connection of the OFDM interface 102 to a MoCA-compatible device, at least one of the signal paths, such as the signal path provided by the PHY layer component 411 and the RF front end 415 may be configured to be backward compatible with at least one MoCA specification.

In a transmit operation, data to be transmitted is received via the Ethernet interface 408 At the MAC 424, the data is distributed to the four PHY layer components 411-414, each of which operates to provide a separate bit-level data stream to the corresponding RF front end. The RF front ends 415-418 convert the bit-level data streams to RF signaling in a corresponding band at a corresponding modulation frequency (e.g., 100 MHz), and the signal combiner/splitter 420 combines the RF signals into a single bonded signal that is bandpass filtered by the bandpass filter 422. The resulting filtered RF signal is then provided to the coaxial cable coupler 406 for transmission along the coaxial cable network 106.

In a receive operation, RF signaling is received at the coaxial cable coupler 406 from the coaxial cable network 106. This received RF signaling is bandpass filtered by the bandpass filter 422. The filtered RF signaling output by the bandpass filter 422 is de-bonded at the signal combiner/splitter 420 into four RF signals. The four RF signals are converted to bit-level digital streams by the RF front ends 415-418, and the resulting four bit-level digital streams are processed at the PHY level by the PHY layer components 411-414. The MAC 424 then combines the four bit streams into a single digital stream that is output via the Ethernet interface 408.

Figure 5:
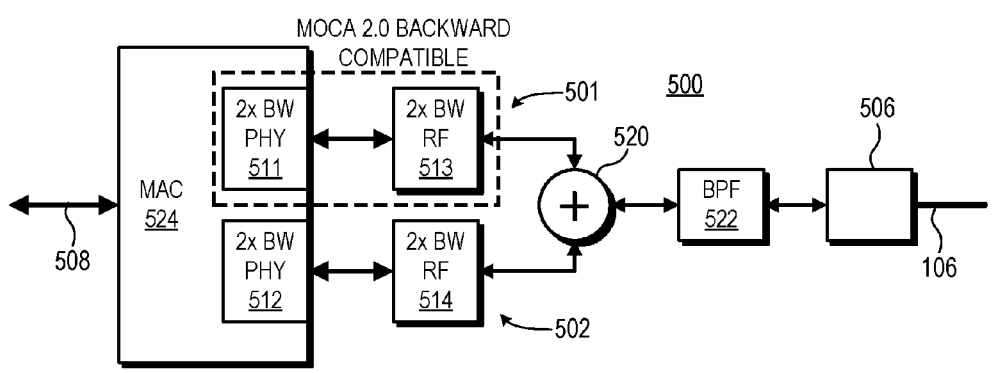
FIG. 5 is a block diagram illustrating yet another example implementation of a bonded OFDM interface of the system of FIG. 1 in accordance with at least one embodiment of the present disclosure.

FIG. 5 illustrates an example implementation 500 of the OFDM interface 102 in accordance with at least one embodiment of the present disclosure. The OFDM interface 104 is likewise implemented, and thus description of the implementation 500 of the OFDM interface 102 refers equally to the corresponding implementation of the OFDM interface 104 unless otherwise noted. In the depicted example, the implementation 500 includes two signal paths 501, 502 between a single Ethernet interface 508 and a coaxial cable coupler 506 that serves to physically and electrically couple the OFDM interface 102 to a corresponding end of the coaxial cable network 106. The signal paths 501, 502 operate as part of a single physical channel dedicated to the Ethernet interface 508. Each signal path includes a PHY layer component and a corresponding RF front end, so that signal path 501 includes PHY layer component 511 and RF front end 513 and signal path 502 includes PHY layer component 512 and RF front end 514. Further, the RF front ends 513, 514 are coupled to a signal combiner/splitter 520, which in turn is connected to a bandpass filter 522. The bandpass filter 522 in turn is coupled to the coaxial cable coupler 506 that is coupled to an end of the coaxial cable network 106.

As there is a single Ethernet interface and single physical channel, in implementation 500, the OFDM interface 102 implements a single MAC 524 which implements the PHY layer components 511, 512. Under this approach, the physical channel has two signal paths that may be modulated at, for example, twice the standard MoCA modulation frequency (e.g., at 200 MHz or 2× BW) and thus the physical channel may have an overall throughput of approximately four times the standard MoCA transceiver throughput. Further, to provide backwards compatibility in anticipation of connection of the OFDM interface 102 to a MoCA-compatible device, at least one of the signal paths, such as the signal path provided by the PHY layer component 511 and the RF front end 513 may be configured to be backward compatible with at least one MoCA specification.

In a transmit operation, data to be transmitted is received via the Ethernet interface 508 At the MAC 524, the data is distributed to the two PHY layer components 511, 512, each of which operates to provide a separate bit-level data stream to the corresponding RF front end. The RF front ends 513, 514 convert the bit-level data streams to RF signaling in a corresponding band at a corresponding modulation frequency (e.g., 200 MHz or 2×BW), and the signal combiner/splitter 520 combines the two RF signals into a single bonded signal that is bandpass filtered by the bandpass filter 522. The resulting filtered RF signal is then provided to the coaxial cable coupler 506 for transmission along the coaxial cable network 106.

In a receive operation, RF signaling is received at the coaxial cable coupler 506 from the coaxial cable network 106. This received RF signaling is bandpass filtered by the bandpass filter 522. The filtered RF signaling output by the bandpass filter 522 is de-bonded at the signal combiner/splitter 520 into two RF signals. The four RF signals are converted to bit-level digital streams by the RF front ends 513, 514, and the resulting two bit-level digital streams are processed at the PHY level by the PHY layer components 511, 512. The MAC 524 then combines the two bit streams into a single digital stream that is output via the Ethernet interface 508.

With reference to the implementations of FIGS. 1-5, in at least one embodiment the MAC and PHY components of these implementations may incorporate an adaptive predicted slotted timing mechanism within the TDMA protocol to further improve bandwidth. Under this approach, the reservation request packets (in which one device requests time on the channel) is eliminated for isochronous traffic (including VOIP, multimedia streaming, etc.) and the network controller (NC) automatically schedules data transmissions at a given interval (typically an integer of the MAP timing of 1 ms) between the transmit device and another device or group devices. The device may indicate the formation/dissolution of an isochronous stream to the NC with a specially-formatted frame, or the NC may monitor reservation requests already issued and adaptively create and destroy flows if it sees a given reservation request pattern.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An orthogonal frequency division multiplexing (OFDM) communication system comprising:
   a first interface comprising:
      a first cable coupler to couple to a first end of a coaxial cable network; and
      a first plurality of signal pathways coupled to the first cable coupler, each signal pathway comprising:
         a physical (PHY) layer component;
         a radio frequency (RF) front end coupled to the PHY layer component;
      an Ethernet interface;
      a media access controller (MAC), each MAC comprising one or more of the PHY layer components of the first plurality of signal pathways;
      a bandpass filter coupled to the first cable coupler; and
      a signal combiner/splitter coupled to the RF front ends of the first plurality of signal pathways and to the one or more bandpass filters.

2. The OFDM communication system of claim 1, further comprising:
   a second interface comprising:
      a second cable coupler to couple to a second end of the coaxial cable network; and
      a second plurality of signal pathways coupled to the second cable coupler, each signal pathway of the second plurality corresponding to a signal pathway of the first plurality and comprising:
         a PHY layer component; and
         an RF front end coupled to the PHY layer component.

3. The OFDM communication system of claim 2, wherein at least one signal pathway of the first plurality of signal pathways and a corresponding signal pathway of the second plurality of signal pathways are compatible with a Multimedia over Coax Cable (MoCA) specification.

4. The OFDM communication system of claim 1, wherein:
   each MAC of the plurality of MACs comprises a corresponding subset of the PHY layer components of the first plurality of signal pathways; and each signal combiner/splitter of the plurality of signal combiners/splitters is coupled to the RF front ends that are coupled to the subset of PHY layer components of a corresponding MAC of the plurality of MACs.

5. The OFDM communication system of claim 1, wherein:
each MAC of the plurality of MACs, comprises a corresponding PHY layer component of the first plurality of signal pathways;
each bandpass filter of the plurality of bandpass filters is coupled to a corresponding RF front end of the first plurality of signal pathways; and
each signal combiner/splitter of the plurality of signal combiners/splitters is coupled to the corresponding PHY layer component of a corresponding MAC of the plurality of MACs.

6. The OFDM communication system of claim 1, wherein:
the first plurality of signal pathways comprises four signal pathways; and
each RF front end implements a 100 megahertz modulation frequency.

7. The OFDM communication system of claim 1, wherein:
the first plurality of signal pathways comprises two signal pathways; and
each RF front end implements a 200 megahertz modulation frequency.

8. The OFDM communication system of claim 1, wherein the OFDM communication system does not employ reservation request packets for transmission.

9. A method comprising:
providing an orthogonal frequency division multiplexing (OFDM) communication system comprising
a coaxial cable network,
a first interface, and
a second interface,
the first interface comprising
a first cable coupler to couple to a first end of the coaxial cable network and
a first plurality of signal pathways coupled to the first cable coupler, wherein each signal pathway of the first plurality comprises a physical (PHY) layer component and a radio frequency (RF) front end coupled to the PHY layer component,
one or more Ethernet interfaces;
one or more media access controllers (MAC), each MAC comprising one or more of the PHY layer components of the first plurality of signal pathways;
one or more bandpass filter coupled to the first cable coupler, and
one or more signal combiner/splitters coupled to the RF front ends of the first plurality of signal pathways and to the one or more bandpass filters
and wherein the second interface comprises
a second cable coupler to couple to a second end of the coaxial cable network and
a second plurality of signal pathways coupled to the second cable coupler, wherein each signal pathway of the second plurality corresponds to a signal pathway of the first plurality and comprises a PHY layer component and an RF front end coupled to the PHY layer component; and
communicating data between the first and second interfaces.

10. An orthogonal frequency division multiplexing (OFDM) communication system comprising:
a first interface comprising:
a first cable coupler to couple to a first end of a coaxial cable network; and
a first plurality of signal pathways coupled to the first cable coupler, each signal pathway comprising:
a physical (PHY) layer component;
a radio frequency (RF) front end coupled to the PHY layer component a plurality of Ethernet interfaces;
a plurality of media access controllers (MACs), each MAC coupled to a corresponding Ethernet interface of the plurality of Ethernet interfaces and comprising a corresponding one or more of the PHY layer components of the first plurality of signal pathways;
a plurality of bandpass filters coupled to the first cable coupler; and
a plurality of signal combiners/splitters, each signal combiner/splitter coupled to a corresponding bandpass filter of the plurality of bandpass filters.

11. The OFDM communication system of claim 10, further comprising:
a second interface comprising:
a second cable coupler to couple to a second end of the coaxial cable network; and
a second plurality of signal pathways coupled to the second cable coupler, each signal pathway of the second plurality corresponding to a signal pathway of the first plurality and comprising:
a PHY layer component; and
an RF front end coupled to the PHY layer component.

12. The OFDM communication system of claim 11, wherein at least one signal pathway of the first plurality of signal pathways and a corresponding signal pathway of the second plurality of signal pathways are compatible with a Multimedia over Coax Cable (MoCA) specification.

13. The OFDM communication system of claim 10, wherein:
the first plurality of signal pathways comprises four signal pathways; and
each RF front end implements a 100 megahertz modulation frequency.

14. The OFDM communication system of claim 10, wherein:
the first plurality of signal pathways comprises two signal pathways; and
each RF front end implements a 200 megahertz modulation frequency.

15. The OFDM communication system of claim 10, wherein the OFDM communication system does not employ reservation request packets for transmission.

* * * * *